UNITED STATES PATENT OFFICE.

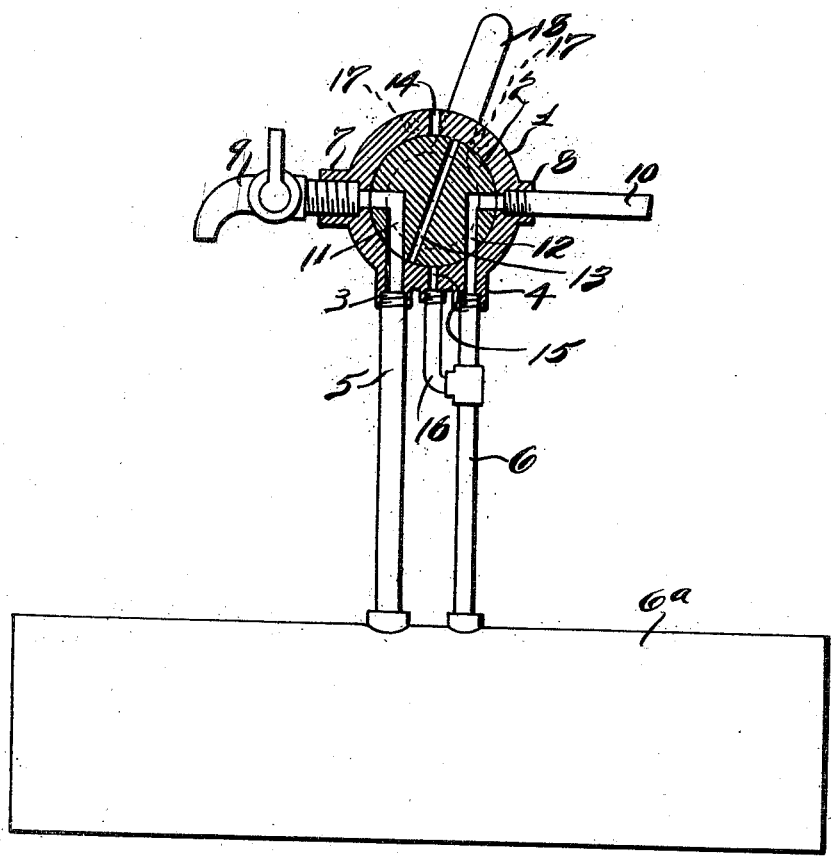
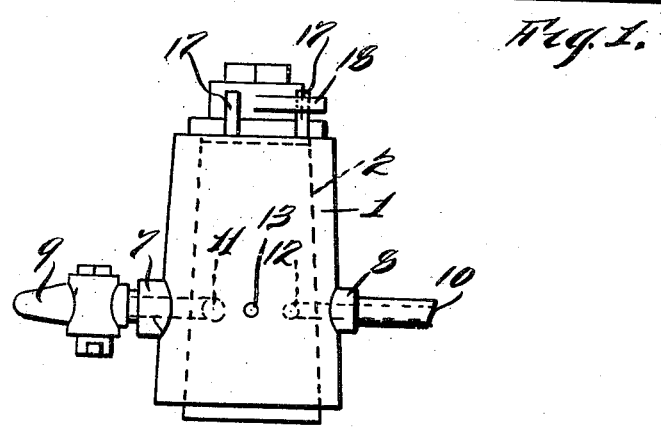

DANIEL M. HEYMAN, OF BROOKLYN, NEW YORK.

CONTROLLING-VALVE FOR COMBUSTIBLE LIQUIDS.

1,049,301.
Specification of Letters Patent.
Patented Dec. 31, 1912.

Application filed April 30, 1912. Serial No. 694,263.

*To all whom it may concern:*

Be it known that I, DANIEL M. HEYMAN, a citizen of the United States, residing at Brooklyn, county of Kings, State of New York, have invented certain new and useful Improvements in Controlling-Valves for Combustible Liquids, of which the following is a full, clear, and exact description.

This invention relates to a controlling valve for combustible liquids such as gasolene, naphtha, benzin, or any other liquid which lets off combustible vapors.

The object of this valve is to provide a device which is adapted to admit air under pressure to a receptacle containing the liquid, when the liquid is to be drawn therefrom, to permit the liquid to flow off, and to open a vent for the gases when the valve is shut off.

In the drawings which form part of this specification Figure 1 illustrates a section of my improved valve, and also a connected receptacle in elevation; and Fig. 2 is an enlarged top plan view of the valve.

My improvement may be carried out in any one of a variety of ways, the form herein illustrated being preferable. As herein illustrated my improved valve comprises a casing 1, provided with a valve proper, indicated by 2, of the stop cock variety.

The casing 1 is, in this instance, provided with two lugs 3 and 4, in which are secured the ends of pipes 5 and 6 respectively, the pipe 5 leading from the supply tank 6ª, for the purpose of drawing off the contents thereof. The pipe 6 connects the valve casing and tank and is intended for the conducting of air under pressure to the tank 6ª, in order to force the contents thereof through the outlet pipe.

The casing 1 is further provided with lugs 7 and 8, the lug 7 having screwed thereinto a spigot 9. The lug 8 receives the end of a pipe 10 which leads from a supply of air under pressure. The valve proper, 2 is provided with passages 11, 12 and 13. The passage 11 alines with the openings in the casing 1, which communicate with the supply pipe 5 and spigot 9, and the passage 12 alines with the openings in the casing 1, which communicate with the air inlet pipe 10 and pipe 6, when the valve 1 is turned for the purpose of drawing off the contents of the tank 6ª.

The passage 13 is a vent and alines with the openings 14 and 15 in the valve casing, when the valve is shut off, so as to allow the gases in the tank 6ª to flow off, through the by-pass 16. Stop pins 17 on the valve casing limit the movement of the handle 18, on the valve 2, for the open and closed positions.

Having now described my invention, what I claim and desire to secure by Letters Patent is:

In combination with a receptacle for combustible liquids, a controlling valve comprising a casing, an air inlet, an outlet and a vent passage, a pipe connecting said air inlet with said receptacle, a pipe connecting said outlet, and said receptacle, a pipe connecting said vent passage with said air pipe, and a valve in said casing provided with a passage adapted to aline with said air inlet, a passage adapted to aline with said inlet and a passage adapted to aline with said vent when said inlet and outlet are shut off.

Signed at New York city, N. Y. this 24 day of April 1912.

DANIEL M. HEYMAN.

Witnesses:
MARCUS I. HOD,
EDWARD A. JARVIS.